2,976,221

PROCESS FOR CONVERSION OF PURINE-CONTAINING TO BENZIMIDAZOLE-CONTAINING VITAMIN $B_{12}$-FACTORS

Elisabeth Becher, Stockstadt (Main), and Konrad Bernhauer and Georg Wilharm, Aschaffenburg, Germany, assignors to Hoffmann-La Roche Inc., Nutley, N.J., a corporation of New Jersey No Drawing. Filed Feb. 4, 1959, Ser. No. 791,011

Claims priority, application Germany Feb. 8, 1958

1 Claim. (Cl. 195—114)

The present invention pertains to a biosynthetic process for conversion of purine-containing vitamin $B_{12}$-factors to benzimidazole-containing vitamin $B_{12}$-factors, especially vitamin $B_{12}$ itself; by the use of microorganisms.

Analogs of vitamin $B_{12}$ are known which contain in their nucleotide portion a purine derivative instead of the 5,6-dimethylbenzimidazole portion of vitamin $B_{12}$, but which otherwise are not different from vitamin $B_{12}$ in their structure. These are designated as "purine factors" of the vitamin $B_{12}$ group. The most important of these vitamin $B_{12}$ analogs are:

Adenine-cobalamine analog (pseudovitamin $B_{12}$);
2-methyladenine-cobalamine analog (factor A);
2-methylmercaptoadenine-cobalamine analog.

By deamination of these factors, the $NH_2$ group in the purine portion can be replaced by an OH group, whereby three further purine factors are obtained; the occurrence of which as natural materials, however, has not been definitely established.

All of these vitamin $B_{12}$ analogs have only limited biological activity. It is true that they are active against certain microorganisms, such as *E. coli* 113-3, *L. leichmannii* 313, *L. lactis* Dorner, etc.; but they are not active, or only slightly active, against *Ochrom. malhamensis*. With respect to animal organisms they are inactive, i.e. they do not support the growth of chicks and other animals; as does vitamin $B_{12}$, and as do other vitamins of the $B_{12}$ group to the extent that they contain a benzimidazole derivative as the base of their nucleotide portion. Moreover, the above named purine factors—insofar as hitherto tested—have been found inactive against pernicious anemia. They are, accordingly, designated as "pseudovitamin $B_{12}$-factors" or "pseudo factors" of the vitamin $B_{12}$ group.

These vitamin $B_{12}$ analogs are very widely distributed in nature. They are formed, so far as now known, predominantly in anaerobic fermentation processes, especially so in the alimentary canal (intestine, rumen); and in sewage purification, by anaerobic digestion of mechanically settled sludge, that is to say in a process which is carried out very generally and on a very large scale. In the recovery of vitamin $B_{12}$ from anaerobic digested sludge, therefore, these purine factors always occur as byproducts in considerable quantities.

These purine factors or pseudo factors of the vitamin $B_{12}$ group were not previously capable of profitable application, as such, because of their limited biological activity. Accordingly, they had first to be degraded by exclusively chemical means to an incomplete factor, factor B; preferably by the action of cerium hydroxide in the presence of cyanide ions. The thus obtained factor B (also known as factor I or etiocobalamine) had then to be converted to vitamin $B_{12}$, or other similar benzimidazole factor.

It has now been found, surprisingly, that direct conversion of purine factors to benzimidazole factors can be achieved by the use of microorganisms. The process comprises effecting growth and fermentation of suitable microorganisms, especially propionic acid bacteria, in a conventional culture medium to which have been added the purine factors to be converted and a base of the benzimidazole series. The purine factors are taken up by the bacterial cells, and thereupon the desired conversion is accomplished by elimination of the purine base and substitution therefor of the added benzimidazole base. Thus, an already complete vitamin $B_{12}$ factor is converted to a different complete factor.

The process according to the invention is carried out essentially in the following manner:

In a medium containing the usual nutrients, especially sugar, an amino acid mixture, phosphate and other nutrient salts, there is caused to grow (for example) a culture of *Propionibacterium shermanii*. After incubation for two days at 28–30° C., the fermentation medium is mixed with the purine factor to be converted, or with a mixture of such factors—even in crude, unpurified condition —and also with a benzimidazole base; such as 5,6-dimethylbenzimidazole in case it is desired to prepare vitamin $B_{12}$ itself. The concentration of the purine factors in the medium amounts to about 5–20 mg. per liter; that of the benzimidazole base to about 20–40 mg. per liter. By further addition of glucose to the culture medium and regulation of the pH value at about 6.5, the fermentation process is kept going for several days.

After completion of the fermentation process, the fermentation broth is centrifuged, adjusting the pH value to about 4–4.5 if necessary. The separated bacterial mass, which may be washed with water, is extracted with hot water (for example at 80–110° C.). There is thus obtained an extract which already possesses an orange color. This is treated with activated carbon. The carbon adsorbate is recovered by filtration or centrifugation and is eluted in conventional manner, e.g. with an aqueous alcohol. The eluate so obtained already possesses the typical pure red color of vitamin $B_{12}$. From the eluate crystalline vitamin $B_{12}$ can easily be recovered by known methods.

If the quantity of purine factors in the culture medium is selected at too high a value, it may happen that the conversion process does not proceed completely in the manner desired. This can be recognized by the fact that, after recovery of the bacterial mass, residual "$B_{12}$ activity" remains in the culture filtrate (recognized, for example, by test with *E. coli* or *L. leichmannii*). As shown by further investigation, this activity is to be attributed to the presence of purine factor residues which were not taken up by the bacteria, whereas the portions assimilated by the cells are practically quantitatively converted. The residual quantities of purine factors remaining in the culture filtrate can be fully used by further addition of sugar to the culture filtrate and renewed fermentation with the same bacteria, which proceeds essentially in the manner already described.

The technical application of the process of the invention can be realized especially in the recovery of vitamin $B_{12}$ from anaerobic digested sludge. Two main routes are available:

(1) A concentrate of various $B_{12}$ factors can be obtained from anaerobic digested sludge, e.g. in the form of a "kieselguhr product" (see German Auslegeschrift 1,016,898), and vitamin $B_{12}$ and factor III can be separated from this concentrate by cellulose chromatography (see German Patents 930,651 and 940,639, among others). Thus the pseudo factors can be obtained as byproducts in relatively pure form. These can be converted e.g. to vitamin $B_{12}$, by the processes of the invention.

(2a) It is also possible to proceed by preparing from the anaerobic digested sludge merely an aqueous extract or a crude concentrate, e.g. in the form of a bentonite- or carbon-eluate which, e.g., in addition to the pseudofactors also contains vitamin $B_{12}$ itself. In such case, the present procedure can be employed with particular success, inasmuch as by the process the pseudo factors present are converted in the presence of 5,6-dimethylbenzimidazole to vitamin $B_{12}$. Thereby not only is the yield of vitamin $B_{12}$ increased, but also there is thus obtained a uniform material, chromatographic separation accordingly being unnecessary.

(2b) Moreover, when there is at hand a mixture of $B_{12}$-factors which contains in addition to vitamin $B_{12}$ and the pseudo factors still other benzimidazole factors, especially factor III, the process of the invention in the last described mode of execution also offers special advantages. That is to say, in such case the process can be effected either with the addition of 5,6-dimethylbenzimidazole, resulting in the conversion of pseudo factors to vitamin $B_{12}$ and increasing the yield of the latter; or the process can be operated in the presence of 5-hydroxybenzimidazole, thereby converting the pseudo factors to factor III and increasing the yield of the latter. In either case, not only is the yield of vitamin $B_{12}$ or, respectively, factor III increased, but also the recovery in pure form of the product is facilitated, since thereby there are only two substances to be separated from each other.

The process according to the invention further has the following desirable technical advantages: The pseudo factors are taken up by the bacterial cells and in the latter are further converted, in the presence of 5,6-dimethylbenzimidazole (or other base of the benzimidazole series). The vitamin $B_{12}$ (or other $B_{12}$ analogs) formed in this manner are, however, retained in the cell. This makes possible a simple recovery of the vitamin $B_{12}$ product concerned, by centrifugation of the bacterial cells and isolation from them of the vitamin $B_{12}$ (or, respectively, $B_{12}$ analog).

However, if it is not desired to work up the bacterial mass, obtained by centrifugation in the above described manner, to pure vitamin $B_{12}$ (or, respectively, other benzimidazole factors of the vitamin $B_{12}$ group), but rather to employ the bacterial mass as a feed additive (APF-product), then it is only necessary to dry the bacterial mass. The thus obtained dry product has a relatively high content of vitamin $B_{12}$, viz., usually well over 100 mg. per kg. It can, therefore, be mixed with other suitable feed materials, such as soya meal, bran, etc., and thus adjusted to the desired vitamin $B_{12}$ content. Obviously, an APF product obtained according to the present process is much more useful than such a product which still contains the purine factors.

The technical advantage attainable by the process according to the invention is obvious, and resides in the fact that by this process the purine factors of the $B_{12}$ group, obtained for example as byproducts of vitamin $B_{12}$ recovery from anaerobic digested sludge for which factors there has hitherto been found no direct use, can now be converted directly to vitamin $B_{12}$ or other valuable benzimidazole factors of the $B_{12}$ group, and so can be made the subject of useful applications, whereas hitherto such was possible only in a much more difficult two-step process.

Details of the execution of the process according to the invention are apparent from the following examples:

*Example 1*

A medium containing the following ingredients per liter, and adjusted to pH 6.7, is sterilized in known manner (30 minutes at 120° C.).

Acid hydrolyzed casein, corresponding to ___g. N__ 1.1
Trypsin-digested casein, corresponding to ___g. N__ 1.6
$NaH_2PO_4$ _____g__ 1.76
$K_3PO_4$ _____g__ 1.76
$MgCl_2 \cdot 6H_2O$ _____g__ 0.4
$FeSO_4 \cdot 7H_2O$ _____mg__ 10
Ca pantothenate _____mg__ 4
Biotin _____mg__ 0.3
Technical glucose _____g__ 10

Then the medium is inoculated with one liter of a culture of *Propionibacterium shermanii* in the same medium, which, however, contains additionally 5 cc. of yeast extract per liter. Incubation is effected under anaerobic conditions at 28–30° C. After fermentation for two days, the whole is mixed with a sterile solution of 50 mg. of pseudovitamin $B_{12}$ and 200 mg. of 5,6-dimethylbenzimidazole. During the process, sterile glucose solution is added from time to time in order to maintain the fermentation, and the pH value is regulated to 6.6 by addition of saturated sodium carbonate solution. After fermentation for six days the process is completed. The mixture is acidified to a pH of 4.0 by addition of sulfuric acid, whereby the bacteria are caused to settle. By centrifugation there are obtained 250 g. of a bacterial mass containing 30% of dry substance. The damp bacterial mass is extracted with water several times under pressure at 110° C., whereby there is obtained a total of 2.5 liters of an orange-red aqueous extract. After cooling, this extract is mixed while stirring with 25 g. of activated carbon, filtered through diatomaceous earth with suction, and the carbon adsorbate is eluted repeatedly at boiling temperature with a mixture of 70 parts by volume of isopropanol, 25 parts by volume of water and 5 parts by volume of benzene, until the eluate is practically colorless. There is thus obtained one liter of a pure red colored eluate, which is concentrated in vacuum to a small volume. From the concentrate there is recovered in known manner 41 mg. of crystalline vitamin $B_{12}$.

*Example 2*

This procedure is effected in similar manner to Example 1, except that here there are employed 75 mg. of factor A as the purine factor and 300 mg. of 5,6-dimethylbenzimidazole. After fermentation for seven days, which in other respects is similar to Example 1, there is obtained in similar manner 65 mg. of crystalline vitamin $B_{12}$.

*Example 3*

This procedure is likewise effected in the same manner as in Example 1, the differences being only that one-tenth of the previously employed volume is employed here, and as purine factor 4 mg. of 2-methylmercapto-adenine-cobalamine analog is added, and 20 mg. of 5,6-dimethylbenzimidazole is employed. The fermentation is effected in similar manner to Example 1. After incubation for six days, and working up of the bacterial mass, there is obtained a purified solution which according to paper-chromatographic examination and spectrophotometric evaluation contains 3.2 mg. of vitamin $B_{12}$.

*Example 4*

One liter of the medium employed in Example 1, as there described in greater detail, is fermented with Propionibacterium W-10. After fermentation for two days the fermentation broth is mixed with 4 mg. of factor A and 30 mg. of 5(6)-hydroxybenzimidazole. The fermentation is maintained for eight days in the manner described in Example 1. The bacterial mass is then recovered and worked up as previously described. There is thus obtained a purified solution, shown by paper-chromatographic and electrophoretic examination to contain practically pure factor III. Spectrophotometric assay indicates a content of 3 mg. of factor III in the solution.

*Example 5*

An aqueous extract is obtained from the sludge deposited upon anaerobic fermentation of yeast waste waters, in the usual way by heating and removal of solid materials by centrifugation. 100 liters of this extract, having a vitamin $B_{12}$ activity of 4.2 mg. per liter in the *E. coli* test and a $B_{12}$ activity of 1.6 mg. per liter in the *Ochromonas malhamensis* test, is mixed with 1 kg. of technical glucose and sterilized in the usual manner. Then it is inoculated with 10 liters of a culture of *Propionibacterium shermanii* in the medium described in Example 1, and the whole is incubated under anaerobic conditions at 28–30° C. After fermentation for two days, a sterile solution of 2 g. of 5,6-dimethylbenzimidazole is added and the fermentation process is maintained for six days by addition from time to time of sterile glucose solution and regulation of the pH valve at 6.6 by addition of concentrated soda solution.

Determination of the vitamin $B_{12}$ activity in the *Ochromonas malhamensis* test indicates a value of 3.8 mg. per liter. This is an indication that the originally present purine factors, which are active against *E. coli*, but not against *Ochromonas malhamensis*, have practically disappeared and been converted to vitamin $B_{12}$. Also, more detailed chemical investigation indicates that a vitamin $B_{12}$ fraction in almost pure form, isolated from an aliquot, possesses practically no purine factors when examined by paper-chromatographic and electrophoretic tests.

The further working up of the fermentation broth is effected in the manner indicated in Example 1. The fermentation broth is mixed with sulfuric acid until a pH value of 4.0 is attained. The thereby flocculated bacteria are separated by centrifugation. There is thus obtained 2.6 kg. of bacterial mass having a content of 30% dry substance. From the damp bacterial mass there is obtained, in the manner described in Example 1, 30 liters of an aqueous extract, which is treated with 300 g. of activated carbon. The carbon adsorbate obtained by centrifugation is eluted exhaustively at boiling temperature with a mixture of 70 parts by volume of isopropanol, 25 parts by volume of water and 5 parts by volume of ortho-dichlorobenzene. From the combined red-colored eluates (15 liters) vitamin $B_{12}$ is obtained in the usual manner.

*Example 6*

2 liters of a medium containing 1% glucose, 0.5% peptone, 0.5% meat extract, 0.5% sodium chloride and 0.1% yeast extract is sterilized in known manner. Then the medium is inoculated with 2.5% of a 48 hours old culture of Streptomyces spec. ATCC 11072 in the same medium. Incubation is effected under aerobic conditions for 5 days at 28° C., 5 mg. of factor A and 40 mg. of 5,6-dimethylbenzimidazole being added after the first day of incubation. The pH value of the culture, which had been adjusted before incubation to 7.2, raises after the end of the incubation period to 7.4. To the culture is added so much of a potassium cyanide solution, that the concentration of cyanide ions is 0.05%, whereupon the culture is heated for 10 minutes to 110° C. The mycelium is filtered off and pressed, whereupon the filtrate produced is mixed with 1% of activated carbon and stirred for ½ hour. The separation and elution of the carbon adsorbate is effected in accordance with Example 1. The eluate is concentrated in vacuo and the concentrate obtained is further purified in manner known per se by phenol extraction. The purified mixture of $B_{12}$ factors obtained is separated electrophoretically and yields 23.6% vitamin $B_{12}$, 50% unchanged starting factor A and 26.4% factor B.

We claim:

A process for the preparation of vitamin $B_{12}$ which comprises growing *Propionibacterium shermanii* in a culture medium comprising a purine-containing vitamin $B_{12}$-factor selected from the group consisting of pseudo-vitamin $B_{12}$, factor A and 2-methylmercaptoadenine-cobalamine analog, in the presence of a compound selected from the group consisting of 5,6-dimethylbenzimidazole and 5(6)-hydroxybenzimidazole.

References Cited in the file of this patent

Ford et al.: Biochem. Jour., vol. 59, No. 1, January 1955, pages 86 to 93.